(12) United States Patent
Kelly et al.

(10) Patent No.: US 9,061,910 B2
(45) Date of Patent: Jun. 23, 2015

(54) COMPOSITIONS, DEVICES AND METHODS FOR HYDROGEN GENERATION

(75) Inventors: Michael T. Kelly, Plainsboro, NJ (US); Jeffrey V. Ortega, Township of Lacey, NJ (US); Richard M. Mohring, East Brunswick, NJ (US)

(73) Assignee: Protonex Technolog Corporation, Southborough, MA (US)

( * ) Notice: Subject to any disclaimer, the term of this patent is extended or adjusted under 35 U.S.C. 154(b) by 485 days.

(21) Appl. No.: 13/570,891

(22) Filed: Aug. 9, 2012

(65) Prior Publication Data

US 2012/0328491 A1 Dec. 27, 2012

Related U.S. Application Data

(62) Division of application No. 11/892,515, filed on Aug. 23, 2007, now Pat. No. 8,268,028.

(60) Provisional application No. 60/907,232, filed on Mar. 26, 2007.

(51) Int. Cl.
| | |
|---|---|
| *B01J 7/00* | (2006.01) |
| *C01B 3/26* | (2006.01) |
| *C01B 3/02* | (2006.01) |
| *C01B 3/06* | (2006.01) |
| *C01B 3/24* | (2006.01) |

(52) U.S. Cl.
CPC ... *C01B 3/26* (2013.01); *C01B 3/02* (2013.01); *C01B 3/065* (2013.01); *C01B 3/24* (2013.01); *C01B 2203/0838* (2013.01); *Y02E 60/362* (2013.01)

(58) Field of Classification Search
CPC .............................. C01B 3/065; Y02E 60/362
See application file for complete search history.

(56) References Cited

U.S. PATENT DOCUMENTS

| | | | |
|---|---|---|---|
| 3,253,884 A | 5/1966 | Kroeger et al. | |
| 4,356,163 A | 10/1982 | Davidson | |
| 5,372,617 A | 12/1994 | Kerrebrock et al. | |
| 5,702,491 A * | 12/1997 | Long et al. ................... | 48/197 R |
| 6,274,093 B1 | 8/2001 | Long et al. | |
| 6,683,025 B2 | 1/2004 | Amendola et al. | |
| 7,101,530 B2 | 9/2006 | Pez et al. | |
| 7,250,232 B2 | 7/2007 | Boysen et al. | |
| 2002/0025462 A1 * | 2/2002 | Nakanishi et al. .............. | 429/19 |
| 2003/0162059 A1 | 8/2003 | Gelsey | |
| 2004/0033455 A1 * | 2/2004 | Tonkovich et al. ................ | 431/7 |
| 2004/0223907 A1 | 11/2004 | Pez et al. | |
| 2005/0142404 A1 | 6/2005 | Boucher et al. | |
| 2005/0191234 A1 | 9/2005 | Mertens et al. | |

(Continued)

FOREIGN PATENT DOCUMENTS

| | | |
|---|---|---|
| JP | 4026501 A | 1/1992 |
| WO | 2007/055146 A1 | 5/2007 |

*Primary Examiner* — Imran Akram
(74) *Attorney, Agent, or Firm* — Locke Lord LLP; David J. Silvia; George N. Chaclas

(57) ABSTRACT

Methods and systems for hydrogen generation from solid hydrogen storage compositions which generate hydrogen in an exothermic reaction wherein the heat released can be absorbed by solid endothermic compositions are disclosed. The solid hydrogen storage compositions comprise mixtures of chemical hydrides and water surrogate compounds. Fuel cartridges suitable for use with compositions which generate hydrogen upon the application of thermal initiation and methods for operating the fuel cartridges are also disclosed.

35 Claims, 10 Drawing Sheets

(56) References Cited

U.S. PATENT DOCUMENTS

| | | |
|---|---|---|
| 2005/0238573 A1 | 10/2005 | Zhang et al. |
| 2006/0188762 A1* | 8/2006 | Gelsey .......................... 429/20 |
| 2006/0191199 A1 | 8/2006 | Rosenzweig et al. |
| 2006/0196112 A1 | 9/2006 | Berry et al. |
| 2006/0257313 A1* | 11/2006 | Cisar et al. ................. 423/648.1 |
| 2006/0269470 A1 | 11/2006 | Zhang et al. |
| 2007/0020172 A1 | 1/2007 | Withers-Kirby et al. |
| 2007/0068071 A1 | 3/2007 | Kelly et al. |
| 2007/0084115 A1 | 4/2007 | Berry et al. |
| 2007/0183967 A1* | 8/2007 | Thorn et al. ................ 423/648.1 |
| 2007/0243128 A1 | 10/2007 | Reichman et al. |
| 2008/0172932 A1 | 7/2008 | Kelly et al. |
| 2008/0236032 A1 | 10/2008 | Kelly et al. |
| 2008/0292541 A1 | 11/2008 | Kamada et al. |
| 2008/0317665 A1 | 12/2008 | Troczynski et al. |
| 2009/0017348 A1 | 1/2009 | Kelly et al. |
| 2010/0288975 A1 | 11/2010 | Cortright et al. |

* cited by examiner

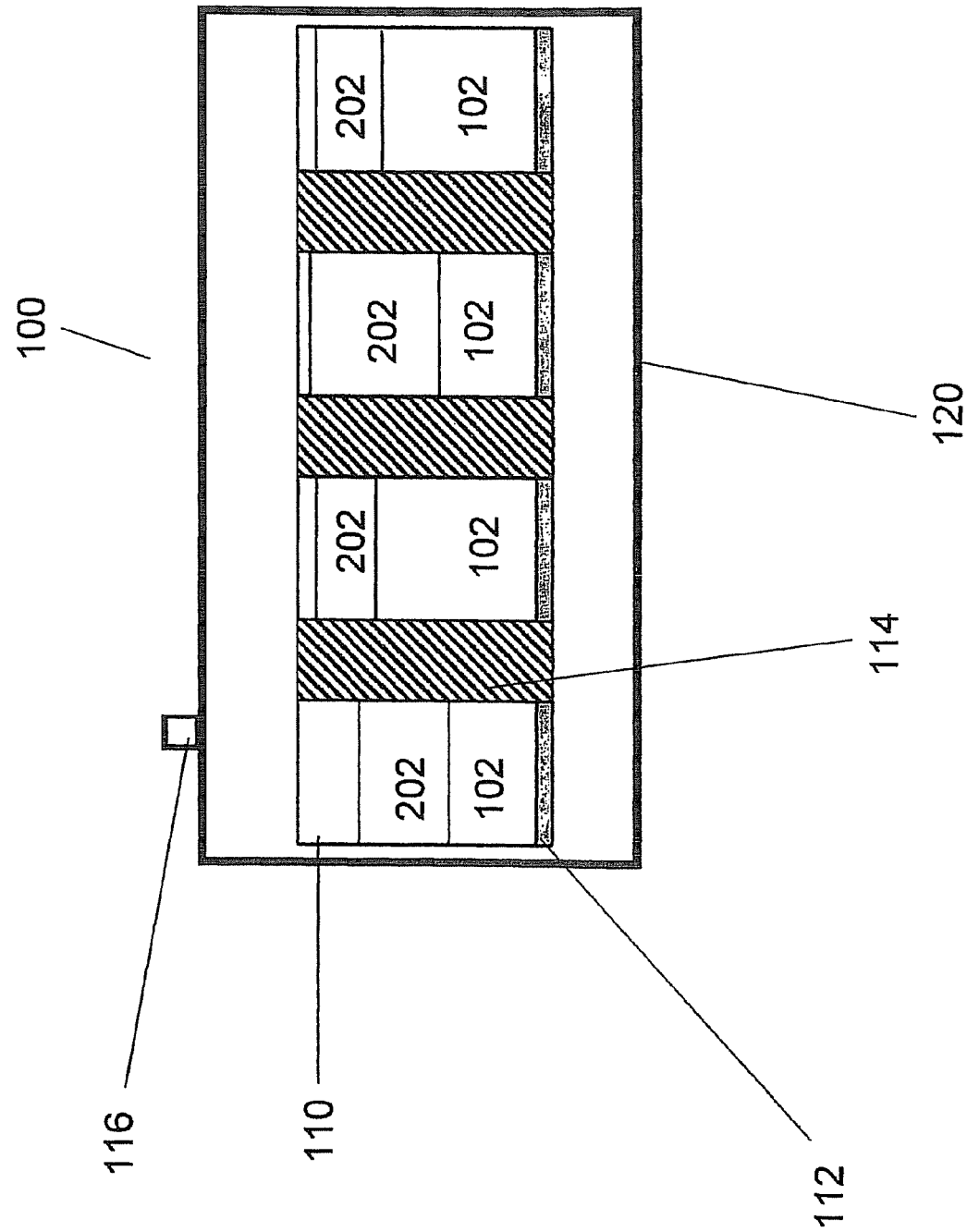

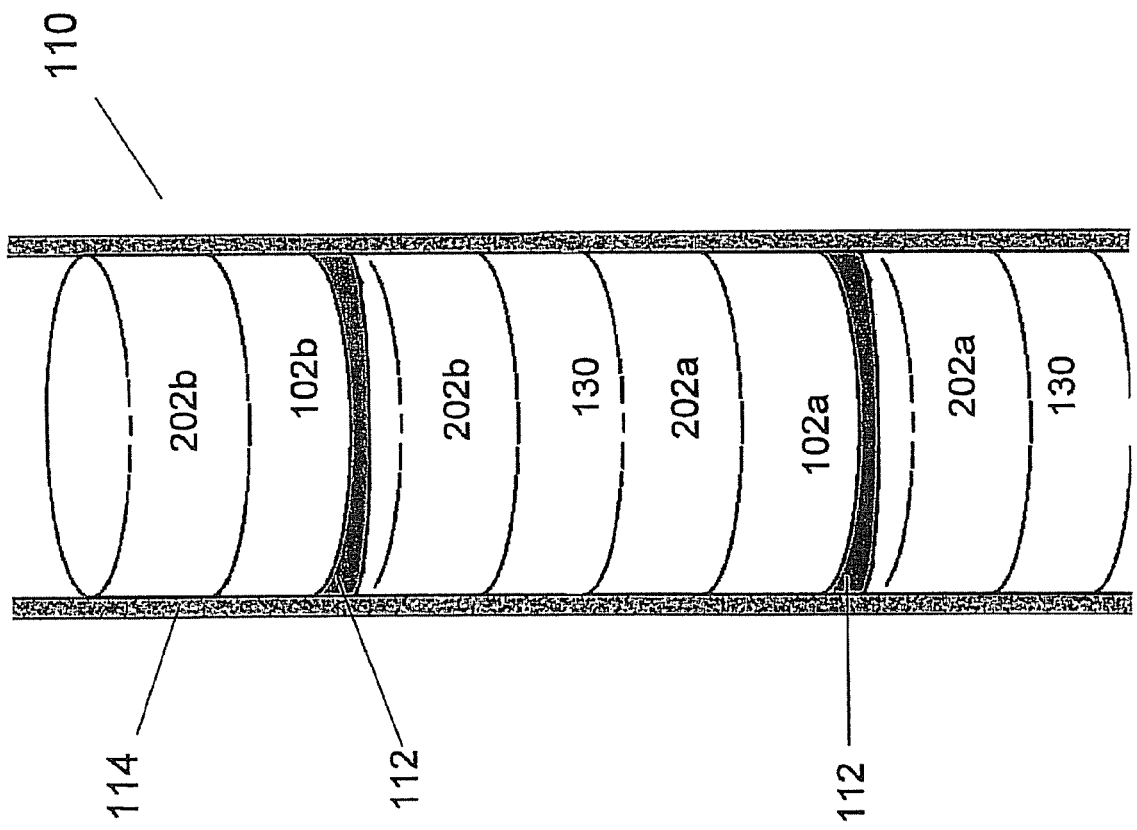

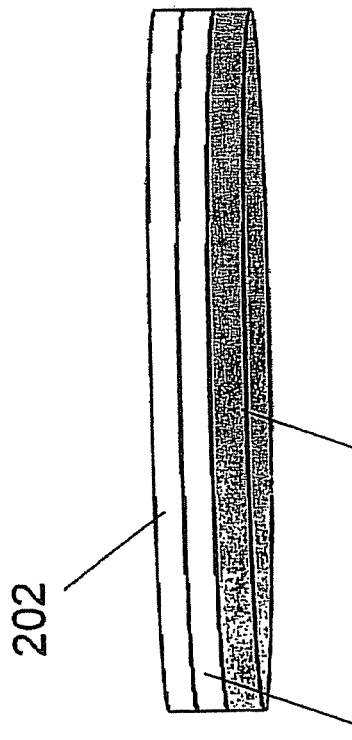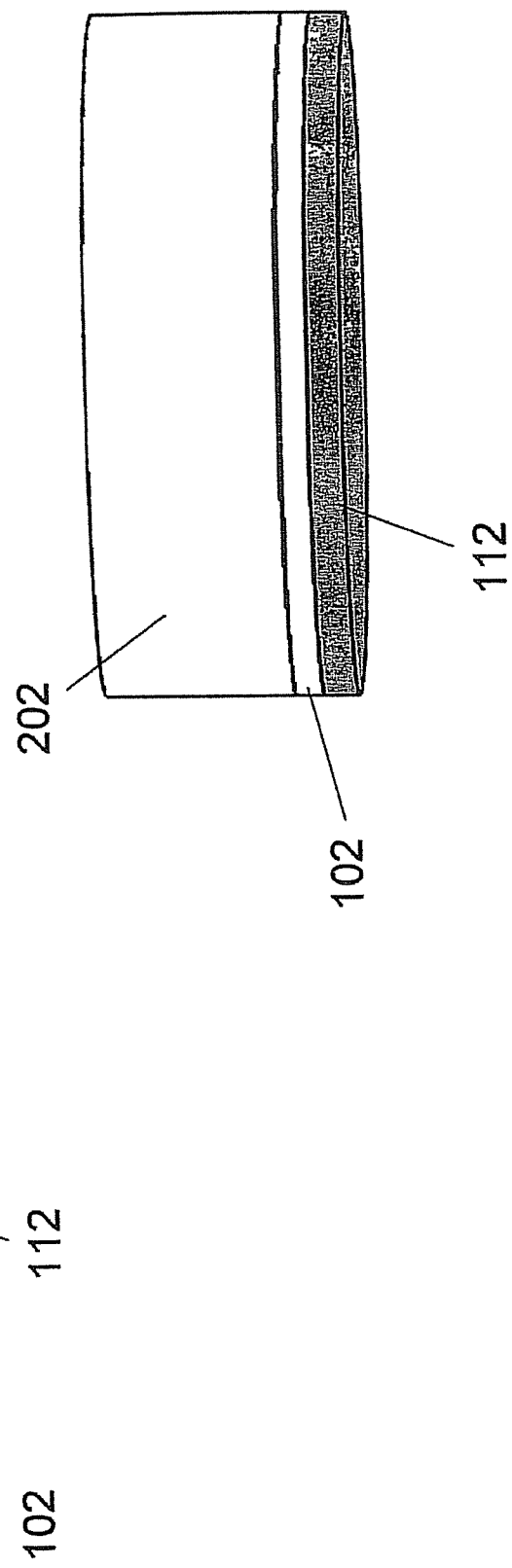

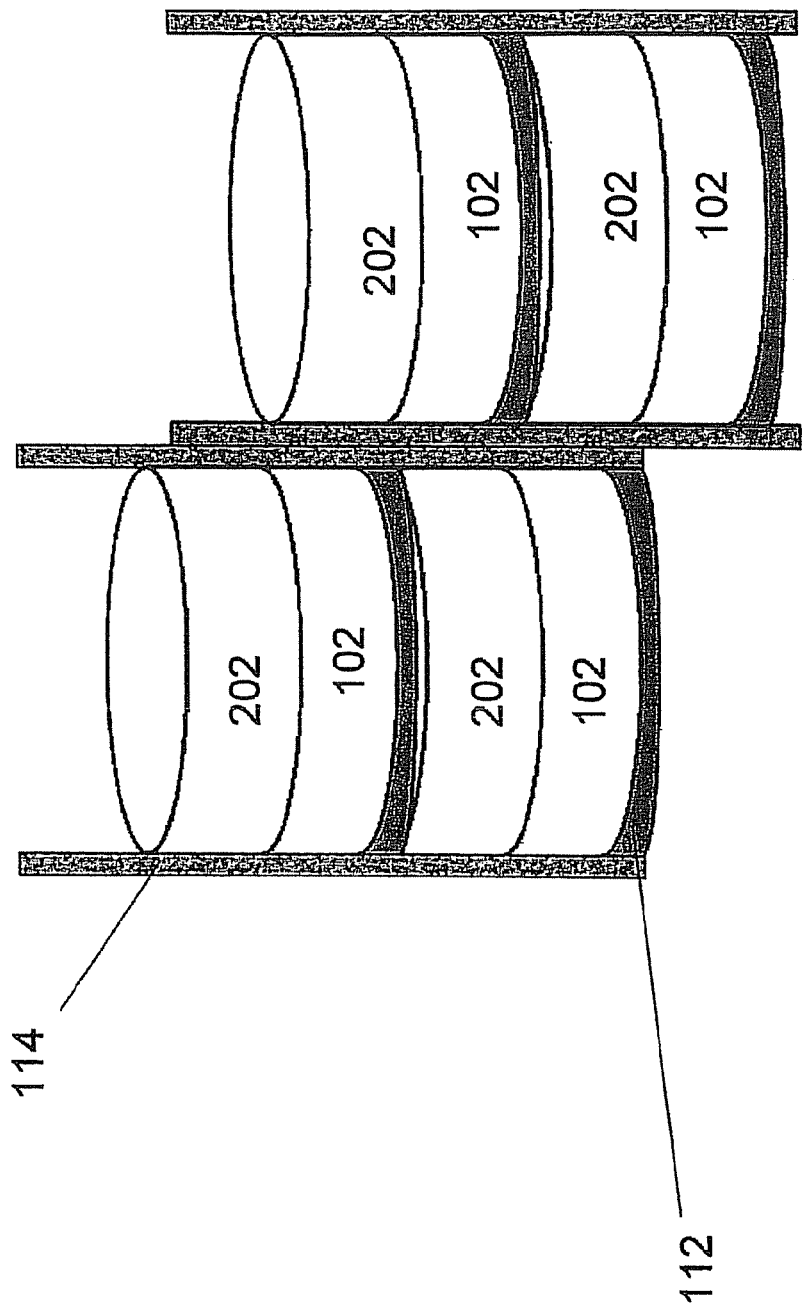

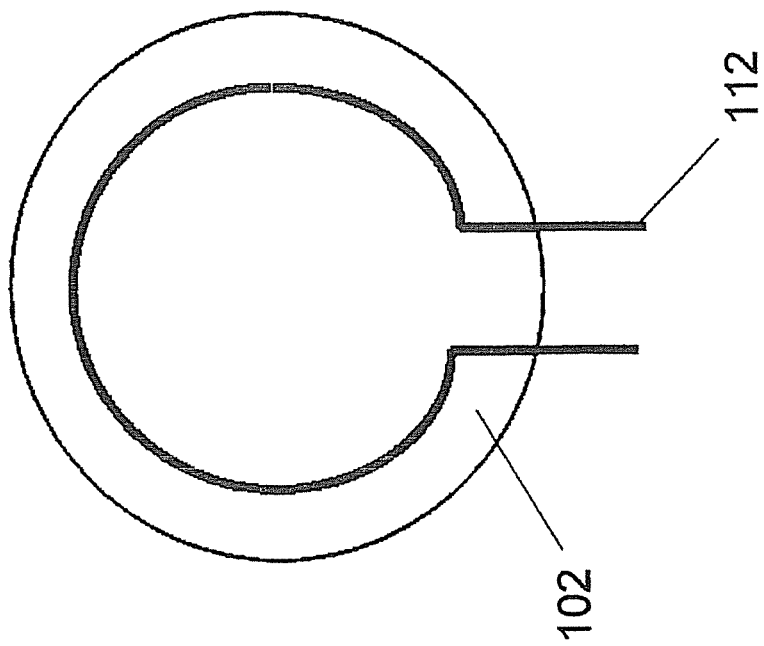
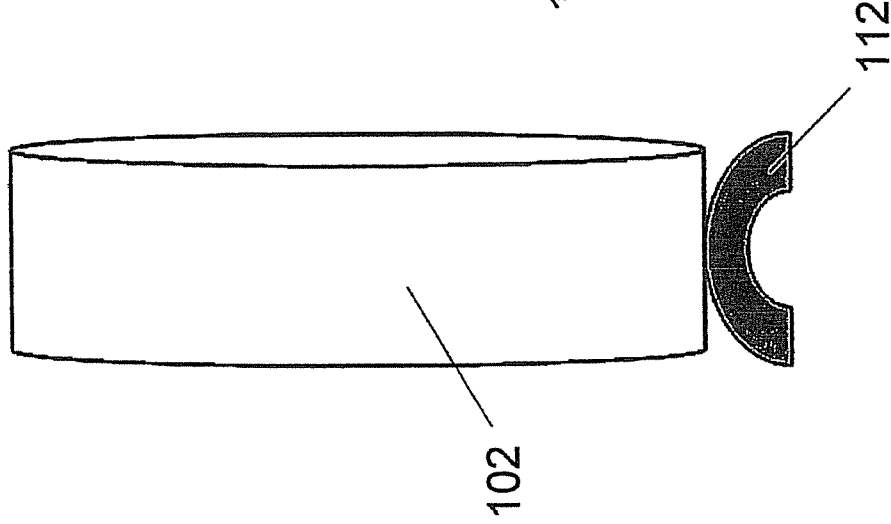
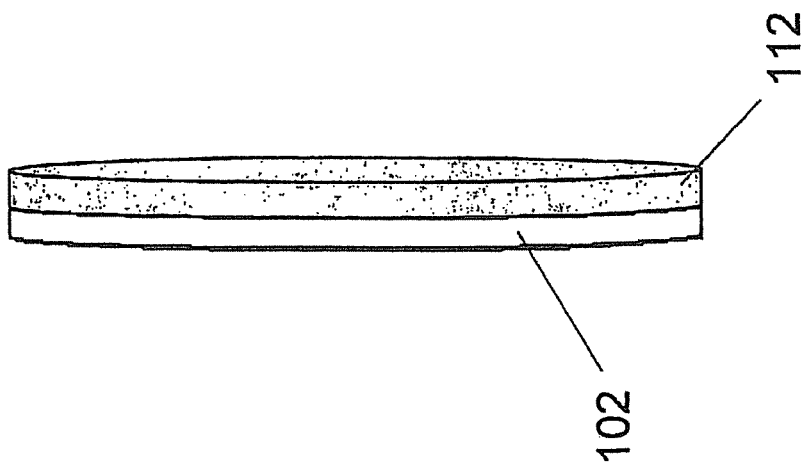

COMPOSITIONS, DEVICES AND METHODS FOR HYDROGEN GENERATION

CROSS-REFERENCE TO RELATED APPLICATIONS

This application claims the benefit of U.S. Provisional Application Ser. No. 60/907,232, filed Mar. 26, 2007, the entire disclosure of which is incorporated herein by reference.

FIELD OF THE INVENTION

The present invention relates to hydrogen storage compositions and methods for thermally initiating hydrogen generation from hydrogen storage compositions.

BACKGROUND OF THE INVENTION

There is an ongoing need for new energy and power sources to meet the growing demand for portable power. Fuel cells are being considered as replacements for batteries. A fuel cell for small applications needs to be compact, lightweight, and have a high energy storage density.

Hydrogen is the fuel of choice for fuel cells. Their adoption is dependent on finding a convenient and safe hydrogen source due to difficulties in storing the gas. Various nongaseous hydrogen carriers, including hydrocarbons, metal hydrides, and chemical hydrides are being considered as hydrogen storage and supply systems. In each case, systems need to be developed to release the hydrogen from its carrier, either by reformation as in the case of hydrocarbons, desorption from metal hydrides, or catalyzed hydrolysis of chemical hydrides.

There is a need for hydrogen generation systems that are compact and that minimize the presence of gaseous hydrogen while providing favorable hydrogen storage metrics. Hydrogen generation systems, wherein operating demands of the fuel cell are matched to control of the flow rate and pressure of the system, are also needed.

BRIEF SUMMARY OF THE INVENTION

The invention provides systems and heat-activated methods of hydrogen generation in which the generation of hydrogen is initiated by the application of heat to hydrogen storage compositions. The present invention also provides fuel cartridges suitable for use with the compositions and methods disclosed herein. The methods provide hydrogen generation systems that minimize the presence of gaseous hydrogen by producing hydrogen on an as-needed basis.

BRIEF DESCRIPTION OF THE DRAWINGS

A complete understanding of the invention may be obtained by reference to the accompanying drawings when considered in conjunction with the following detailed description, in which:

FIG. 1 is a cross sectional view of an exemplary fuel cartridge useful in embodiments of the invention.

FIGS. 2A, 2B, and 2C are cross sectional views of fuel compartment arrangements in accordance with embodiments of the invention.

FIGS. 3A and 3B illustrate alternate configurations of exothermic and endothermic compositions in accordance with embodiments of the invention.

FIG. 4 is a cross sectional view of a multiple layer arrangement of fuel compartments in accordance with an embodiment of the invention.

FIGS. 8A, 8B, and 8C illustrate arrangements of initiation elements useful in embodiments of the invention.

DETAILED DESCRIPTION OF THE INVENTION

Figure 2A:
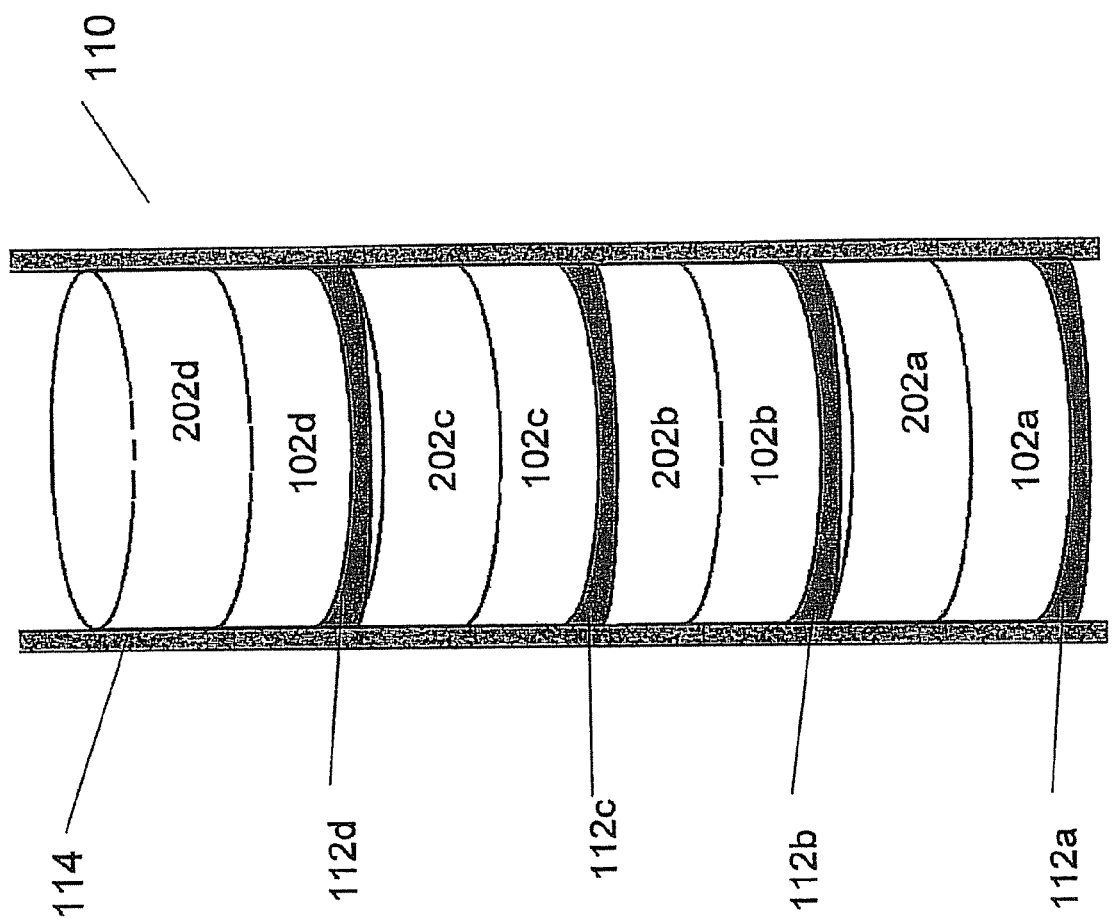

The invention provides methods for thermally initiated hydrogen generation from solid exothermic hydrogen storage compositions wherein the heat released can be absorbed by solid endothermic compositions. The invention further provides methods for thermally initiated hydrogen generation from solid hydrogen storage compositions wherein hydrogen is generated in an exothermic reaction and the heat released can be used to initiate hydrogen generation from solid hydrogen storage compositions in an endothermic reaction. The invention also provides reactors for the generation of hydrogen, wherein at least one exothermic hydrogen generation reaction is coupled to at least one endothermic hydrogen generation reaction, and fuel cartridges suitable for use with the reactors and methods disclosed herein. The reactors and processes of the present invention provide passive hydrogen generation systems with minimal system complexity. By coupling heat-absorbing and heat-releasing materials together, the hydrogen generating materials within a storage cartridge can be packaged efficiently and safely.

One embodiment of the invention provides a process for generating hydrogen comprising: providing at least one solid fuel composition which generates hydrogen in an exothermic reaction, and providing at least one hydrogen generation composition which generates hydrogen in an endothermic reaction; using thermal initiation to generate hydrogen and heat from the exothermic solid fuel composition; and using the heat to generate hydrogen from the endothermic hydrogen generation composition.

Another embodiment of the invention provides a process for generating hydrogen comprising: providing at least one solid fuel composition which generates hydrogen in an exothermic reaction, and providing at least one gas generation composition which generates a gas in an endothermic reaction; using thermal initiation to generate hydrogen and heat from the exothermic solid fuel composition; and using the heat to generate a gas from the endothermic gas generation composition.

In another embodiment, the invention provides a fuel cartridge that provides hydrogen for conversion to energy by a power module comprising a fuel cell or hydrogen-burning engine, or to a hydrogen storage device such as a hydrogen cylinder, a metal hydride, or a balloon. The fuel cartridge comprises a housing containing a plurality of fuel compartments separated from one another, and at least one initiation element in communication with at least one fuel compartment containing at least one solid fuel composition which generates hydrogen in an exothermic reaction, and at least one fuel compartment containing at least one gas generation composition which generates a gas in an endothermic reaction.

In another embodiment, the invention provides a fuel cartridge that provides hydrogen for conversion to energy by a power module comprising a fuel cell or hydrogen-burning engine, or to a hydrogen storage device such as a hydrogen cylinder, a metal hydride, or a balloon. The fuel cartridge comprises a housing containing a plurality of fuel compartments separated from one another by porous walls, and at least one initiation element in communication with at least one fuel compartment containing at least one solid fuel composition which generates hydrogen in an exothermic reaction, and at least one fuel compartment containing at least one gas generation composition which generates a gas in an endothermic reaction.

In another embodiment, the invention provides a fuel cartridge that provides hydrogen for conversion to energy by a power module comprising a fuel cell or hydrogen-burning engine or to a hydrogen storage device such as a hydrogen cylinder, a metal hydride, or a balloon. The fuel cartridge comprises a housing containing a plurality of fuel compartments separated from one another by porous walls, wherein each fuel compartment contains at least one solid fuel composition which generates hydrogen in an exothermic reaction and at least one gas generation composition which generates a gas in an endothermic reaction, and at least one initiation element in communication with at least one solid fuel composition which generates hydrogen in an exothermic reaction.

In another embodiment, the invention provides a fuel cartridge that provides hydrogen to a power module comprising a fuel cell or hydrogen-burning engine for conversion to energy, or to a hydrogen storage device such as a hydrogen cylinder, a metal hydride, or a balloon. The fuel cartridge comprises a housing containing a plurality of fuel compartments separated from one another by porous walls, wherein each fuel compartment contains at least one solid fuel composition which generates hydrogen in an exothermic reaction and at least one gas generation composition which generates a gas in an endothermic reaction separated from each other by a porous spacer, and at least one initiation element in communication with at least one solid fuel composition which generates hydrogen in an exothermic reaction.

The methods and reactors of the present invention can be operated to produce hydrogen in an as-needed mode in which hydrogen is consumed or utilized immediately or on an ongoing basis. Alternatively, the methods and reactors can be used in a batch mode in which hydrogen is generated and stored in a ballast region until required by the hydrogen consuming device.

The term "solid," as used herein encompasses any nongaseous and nonliquid form, including powders, caplets, tablets, pellets, granules, rods, fibers, crystals, and monoliths, for example.

As used herein, the term "exothermic" means that heat is released when hydrogen is produced. Exothermic hydrogen generation storage compositions useful in embodiments of the invention preferably include mixtures of at least one chemical hydride compound and at least one "water surrogate" source. The water surrogate/chemical hydride compositions are preferably solid. The individual components may be physically mixed together, or may be combined into a pellet, caplet, or tablet comprising at least two components. Hydrogen is generated when heat is applied to the exothermic hydrogen generation storage composition either by heating a reactor containing the materials or by an initiation element that is in contact with the hydrogen storage compositions. Heat need only be applied to initiate hydrogen generation. Once initiated, the hydrogen generation reaction is self-sustaining and the hydrogen storage composition need not be heated continuously during the reaction. Preferably, the hydrogen generation reaction is initiated at a temperature (i.e., the "onset temperature") between about 313 K to about 773 K, preferably between about 333 K to about 523 K, more preferably between about 373 K to about 473 K, and most preferably between about 393 K to about 453 K. As used herein, the term "about" is held to mean within 10% of the stated value.

Suitable chemical hydrides include, but are not limited to, boron hydrides, ionic hydride salts, and aluminum hydrides. These chemical hydrides may be utilized in mixtures or individually. The hydrogen atoms contained within the chemical hydrides are referred to herein as "hydridic hydrogens," and can be represented as "H$^-$". A hydridic hydrogen is a hydrogen atom bound to an element less electronegative than hydrogen on the Pauling scale or is bound to Ru, Rh, Pd, Os, Ir, Pt, Au, or As.

As used herein, the term "boron hydrides" includes boranes, polyhedral boranes, and anions of borohydrides or polyhedral boranes. Suitable boron hydrides include, without intended limitation, the group of borohydride salts [M(BH$_4$)$_n$], triborohydride salts [M(B$_3$H$_8$)$_n$], decahydrodecaborate salts [M$_2$(B$_{10}$H$_{10}$)$_n$], tridecahydrodecaborate salts [M(B$_{10}$H$_{13}$)$_n$], dodecahydrododecaborate salts [M$_2$(B$_{12}$H$_{12}$)$_n$], and octadecahydroicosaborate salts [M$_2$(B$_{20}$H$_{18}$)$_n$], where M is an alkali metal cation, alkaline earth metal cation, aluminum cation, zinc cation, or ammonium cation, and n is equal to the charge of the cation. For the above-mentioned boron hydrides, M is preferably sodium, potassium, lithium, or calcium. Suitable borane hydrides also include, without intended limitation, neutral borane compounds, such as decaborane(14) (B$_{10}$H$_{14}$), tetraborane(10) (B$_4$H$_{10}$), and ammonia borane compounds. As used herein, the term "ammonia boranes" includes compounds containing N—H and B—H bonds such as (a) compounds represented by formula NH$_x$BH$_y$, wherein x and y are independently an integer from 1 to 4 and do not have to be the same, including NH$_3$BH$_3$; (b) compounds represented by formula NH$_x$RBH$_y$, wherein x and y are independently an integer from 1 to 4 and do not have to be the same, and R is a methyl or ethyl group; (c) NH$_3$B$_3$H$_7$; and (d) dimethylamine borane (NH(CH$_3$)$_2$BH$_3$).

Ionic hydrides include, without intended limitation, zinc hydride and the hydrides of alkali metals and alkaline earth metals having the general formula MH$_n$ wherein M is a cation selected from the group consisting of alkali metal cations such as sodium, potassium or lithium and alkaline earth metal cations such as magnesium or calcium, and n is equal to the charge of the cation. Examples of suitable metal hydrides, without intended limitation, include lithium hydride, sodium hydride, magnesium hydride, calcium hydride, zinc hydride, and the like.

Aluminum hydrides include, for example, alane (AlH$_3$) and the aluminum hydride salts including, without intended limitation, salts with general formula M(AlH$_4$)$_n$, where M is an alkali metal cation, alkaline earth metal cation, aluminum cation, zinc cation, or ammonium cation, and n is equal to the charge of the cation.

Optionally, the boron or other chemical hydride fuel component may be combined with a stabilizer agent selected from the group consisting of metal hydroxides, anhydrous metal metaborates, and hydrated metal metaborates, and mixtures thereof. Solid stabilized fuel compositions comprising about 20 to about 99.7 wt-% borohydride and about 0.3 to about 80 wt-% hydroxide salts are disclosed in co-pending U.S. patent application Ser. No. 11/068,838 entitled "Borohydride Fuel Composition and Methods" and filed on Mar. 2, 2005, the disclosure of which is incorporated by reference herein in its entirety.

As used herein, the term "water surrogate" sources means a substance that when mixed with a chemical hydride and upon warming to a temperature above ambient mimics the hydrogen generation reaction of a chemical hydride and water. It is not necessary that free water molecules be isolated or produced during heating. Water surrogate sources useful in the invention include "proton sources" and "chemical water compounds," which terms are defined below.

As used herein, the term "proton source" means a compound that has at least one "protic hydrogen" that can be represented as "H$^+$"; a protic hydrogen is a hydrogen atom bound to an element more electronegative than hydrogen on the Pauling scale or is bound to Te.

Solid proton sources useful in embodiments of the invention include, for example, hydroxide salts of alkali and alkaline earth metals; zinc hydroxide; alkali metal dihydrogen phosphate salts; alkali metal dihydrogen citrate salts; alcohols; polymeric alcohols; silicates, silica sulfuric acid; acid chloride compounds; hydrogen sulfide; amines; solid state acids with the general formula $M_y[O_pX(OH)_q]_n$ where X is S, P, or Se, M is an alkali metal or $NH_4$, q is an integer from 0 to 3, p is an integer from 0 to 3, y is the valence of the anion $[O_pX(OH)_q]$, and n is the valence of M; sulfate and phosphate salts of alkali and alkaline earth metals; and hydroxide compounds of Group 13 elements. Representative examples of proton sources include, but are not limited to, boric acid, aluminum hydroxide, lithium hydroxide, sodium hydroxide, potassium hydroxide, cesium hydroxide, magnesium hydroxide, sodium dihydrogen phosphate ($NaH_2PO_4$), $Si(OH)_4$, $Zn(OH)_2$, sodium dihydrogen citrate ($C_6H_7NaO_7$), polyvinyl alcohol, sodium sulfate, sodium phosphate, $Si(OH)_4$, $CsHSO_4$, $CsHSeO_4$, and $CsH_2PO_4$. Representative examples of hydrogen storage compositions incorporating proton sources are provided in Table 1.

TABLE 1

| Compositions | wt-% $H_2$ |
| --- | --- |
| 2 $LiAlH_4$ + 1 $Al(OH)_3$ | 6.87 |
| 3 $LiAlH_4$ + 4 $B(OH)_3$ | 6.70 |
| 2 $BH_3NH_3$ + 2 $LiAlH_4$ + 1 $Al(OH)_3$ | 10.67 |
| 2 $MgH_2$ + $LiBH_4$ + $Si(OH)_4$ | 7.09 |
| 2 $LiAlH_4$ + $NaHSO_4$ | 4.11 |
| 2 $MgH_2$ + 2 NaH + $NaH_2PO_4$ | 3.66 |
| 4 $LiAlH_4$ + 6 LiOH | 7.16 |
| $LiBH_4$ + 2 $LiNH_2$ | |

Preferably, the exothermic hydrogen storage compositions, according to embodiments of the invention, comprise mixtures of chemical hydrides with hydroxide compounds such as the hydroxide salts of alkali and alkaline earth metals and hydroxide compounds of Group 13 elements. These are combined in an admixture such that there are more hydridic hydrogens contributed by the chemical hydrides than protic hydrogens contributed by the hydroxide compounds (determined on a molar basis) in the composition. This is generally achieved by providing the chemical hydride in molar excess relative to the hydroxide compound. Preferred compositions comprise from about 0 to about 6 moles of an aluminum hydride compound, from about 0 to about 6 moles of a boron hydride compound, from about 0 to about 4 moles of an ionic hydride compound, and from about 0 to about 1 moles of a hydroxide compound. In some preferred embodiments, the compositions comprise from about 0 to about 6 moles of an aluminum hydride compound, from about 0 to about 60 moles of an ammonia borane compound, from about 0 to about 180 moles of an ionic hydride compound, and from about 0 to about 1 moles of a hydroxide compound.

The term "chemical water compound" as used herein means a compound, polymer, or salt that generates water equivalents via intramolecular or intermolecular reactions that occur upon warming to a temperature preferably above ambient. Chemical water compounds do not contain molecular water in the form of $H_2O$ molecules.

Chemical water compounds useful in the present invention include, for example, carbohydrates including hexoses, pentoses, and sugar alcohols; borate salts; carboxylic acids; bicarbonate salts; allylic alcohols; and those compounds provided in U.S. Provisional Application Ser. No. 60/907,232, filed Mar. 26, 2007, and U.S. application Ser. No. 11/524,446, filed Sep. 21, 2006, the entire disclosures of which are incorporated herein by reference in their entirety. Preferably, chemical water compounds include mannitol, sorbitol, myo-insitol, fructose, glucose, disodium tetraborate tetrahydrate ($Na_2B_4O_7 \cdot 4 H_2O$, or $Na_2O \cdot 2 B_2O_3 \cdot 4 H_2O$), sodium metaborate dihydrate ($NaB(OH)_4$, or ½ $Na_2O \cdot ½ B_2O_3 \cdot 2 H_2O$), pinnoite ($MgB_2O_4 \cdot 3 H_2O$, or $MgO \cdot B_2O_3 \cdot 3 H_2O$), sodium bicarbonate, citric acid, and malic acid. Representative examples of hydrogen storage compositions incorporating chemical water sources are provided in Table 2.

TABLE 2

| Compositions | wt-% $H_2$ |
| --- | --- |
| 3 moles $NaBH_4$ + 1 mole sorbitol | 8.18 |
| 12 moles LiH + 1 mole fructose | 8.78 |
| 1 mole $NaBH_4$ + 1 mole fructose | 7.40 |
| 3 moles $LiBH_4$ + 1 mole mannitol | 9.77 |

As used herein, "endothermic" means that the composition absorbs heat. Suitable solid endothermic compositions for use in the methods of the invention include materials and mixtures that are capable of absorbing heat that is released by the exothermic hydrogen storage composition and undergoing a chemical or physical change. In an adiabatic system, it is preferred that the solid endothermic composition be capable of absorbing most of the heat that the exothermic hydrogen storage composition is capable of releasing, though under non-adiabatic conditions, some heat will be lost to the environment and the endothermic composition need not absorb all of the heat released by the exothermic hydrogen storage composition.

The chemical change undergone by the endothermic composition may be a chemical reaction that generates a gas, such as carbon dioxide or hydrogen. Endothermic compositions comprising carbonate compounds, for example but not limited to $MgCO_3$, $CaCO_3$, $Na_2CO_3$, $ZnCO_3$, and $NaHCO_3$, will produce carbon dioxide when heat is absorbed. An example of this type of endothermic gas generation composition is shown in the following Equation:

$$MgCO_3 \rightarrow MgO + CO_2 \, \Delta H(300° C.) = -99 \text{ kJ} \qquad \text{Eqn. 1}$$

Endothermic compositions that include (a) at least one chemical hydride combined with at least one alkali or alkaline earth metal amide or imide; or (b) at least partially hydrogenated pi-conjugated organic systems; or (c) metal hydrides, will produce hydrogen gas upon the absorption of heat. Examples of suitable hydrogen storage compositions are provided in Table 3, and further described below.

TABLE 3

| Compound | wt. $H_2$ (%) | $H_2$ Evolution Temp Range (° C.) |
|---|---|---|
| $LiNH_2 + 2LiH$ | 10.4 | 150-245 |
| $LiAlH_4 + 2LiNH_2$ | 9.6 | 125-250 |
| $2LiAlH_4 + LiNH_2$ | 10.2 | 125-250 |
| $LiBH_4 + 2LiNH_2$ | 11.9 | 250-300 |
| $Mg(NH_2)_2 + 4LiH$ | 9.2 | 135-290 |
| $MgH_2 + 2LiNH_2$ | 8.4 | 135-190 |
| $MgH_2$ | 7.7 | 280-300 |
| $Mg_2NiH_4$ | 3.6 | 280 |
| $LaNi_5H_6$ | 1.4 | 25 |
| Perhydro-Coronene ($C_{24}H_{36}$)—24H | 7.4 | 169 |
| Perhydro-4,7-phenanthroline ($C_{12}N_2H_{22}$)—14H | 7.2 | 150-225 |
| Perhydro-N-methylcarbazole ($C_{13}NH_{23}$)—12H | 6.2 | 125-200 |
| Perhydro-N-ethylcarbazole ($C_{14}NH_{25}$)—12H | 5.8 | 100-200 |
| Perhydro-N-methylimidazole ($C_4N_2H_{10}$)—4H | 4.7 | 60-125 |

(A) While not wishing to be bound by theory, mixtures of chemical hydrides and alkali or alkaline earth metal nitrogen hydrogen compounds, such as amides or imides, undergo dehydriding reactions to produce hydrogen when heated. These mixtures can comprise equimolar amounts of chemical hydrides and metal nitrogen hydrogen compounds, or one of the metal nitrogen hydrogen compound or chemical hydride may be present in molar excess. Preferably, the metal nitrogen hydrogen compound is selected from the group consisting of $LiNH_2$, $NaNH_2$, $KNH_2$, $CsNH_2$, $Mg(NH_2)_2$, $Ca(NH_2)_2$, $Li_2NH$, $Na_2NH$, $K_2NH$, $MgNH$, and $CaNH$, and the chemical hydride is preferably selected from the group of $NaBH_4$, $LiBH_4$, $KBH_4$, $MgH_2$, $LiH$, $NaH$, $KH$, $LiAlH_4$, and $NaAlH_4$. As an example, the reaction between lithium amide and lithium hydride occurs as shown in Equation 2 to produce hydrogen:

$$LiNH_2 + 2LiH \rightarrow Li_3N + 2H_2 \quad 10.4 \text{ wt-\% } H_2, 161 \text{ kJ overall} \qquad \text{Eqn. 2}$$

(B) Methods and compositions suitable for dehydrogenation of at least partially hydrogenated analogues of pi-conjugated organic systems to produce polycyclic aromatic hydrocarbons are disclosed, for example, in U.S. Pat. No. 7,101,530 B2 entitled "Hydrogen Storage by Reversible Hydrogenation of Pi-Conjugated Substrates," the entire disclosure of which is hereby incorporated herein in its entirety. As an example, two at least partially hydrogenated analogues of the compound naphthalene ($C_{10}H_8$) are tetralin ($C_{10}H_{12}$) and decalin ($C_{10}H_{18}$).

Suitable at least partially hydrogenated pi-conjugated organic systems include the perhydrogenated analogues of polycyclic hydrocarbons or polymeric aromatic hydrocarbons, among others. These fused ring structures release hydrogen with the absorption of heat to produce pi-conjugated molecules such as hexabenzocoronene, polyacenes, rubicene, picene, ovalene, coronene, perylene, pyrene, phenanthrene, anthracene, naphthalene, benzene, indolylmethane, indolocarbazoles, N-alkylcarbazoles, fluorene, indene, and acenaphthylene, and polymeric hydrocarbons with heteroatoms including polyfurans, polypyrroles, polyindoles, and polycarbazoles. The at least partially hydrogenated pi-conjugated organic systems can incorporate one or more heteroatoms selected from the group consisting of nitrogen, oxygen, silicon, boron, sulfur, and phosphorous. Catalysts including, for example, platinum, palladium, rhodium, cobalt, and ruthenium, supported on substrates such as activated carbon, coke, charcoal, or alumina ($Al_2O_3$), can be included with the at least partially hydrogenated pi-conjugated organic systems to promote hydrogen production.

(C) Metal hydrides that will release hydrogen upon the application of heat include compounds such as $NaAlH_4$, $Na_3AlH_6$, $LiNH_2$, $MgH_2$, $LiBH_4$—$MgH_2$ mixtures, and AB-, $AB_2$-, $AB_5$-, and $A_2B$-type metal hydrides, including the hydrides of metal alloys of titanium, iron, manganese, nickel, and chromium, such as $Mg_2Ni$, $LaNi_5$, and $FeTi$.

Fuel compositions comprising at least one chemical hydride and zinc carbonate basic (the double salt of zinc carbonate and zinc hydroxide in 2-to-3 stoichiometric proportion represented by formula $2 ZnCO_3 \cdot 3 Zn(OH)_2$), can be used in accordance with embodiments of the present invention. The combination of the at least one chemical hydride and the zinc hydroxide will react to produce hydrogen in an exothermic reaction, from which the heat evolved can be transferred to the zinc carbonate salt to produce carbon dioxide in an endothermic reaction.

Exothermic hydrogen storage compositions used in conjunction with solid endothermic compositions in accordance with embodiments of the present invention are preferably packaged in a fuel cartridge or other storage device. The fuel cartridge can provide hydrogen to a power module comprising a fuel cell or hydrogen-burning engine for conversion to energy, or to a hydrogen storage device such as a hydrogen cylinder, a metal hydride, or a balloon. The fuel cartridge controls hydrogen release from the fuel compositions using an array of fuel compartments and thermal initiators, in which the fuel compartments are separated from each other.

Referring now to FIG. 1, an exemplary fuel cartridge 100 useful in embodiments of the present invention comprises a plurality of fuel compartments 110 separated by walls 114 and disposed within a housing 120. At least a portion of the fuel compartment's walls 114 are porous and are configured to allow the hydrogen generated within each fuel compartment to pass into the fuel cartridge while retaining the pre- and post-reaction solids with the fuel compartment 110. The fuel compartments can be tubes, or can be formed as compartments within a material. As used herein, the term "tube" is not limited to circular forms and structures, and can include, for example, hexagonal tubes or structures or square tubes or structures among others. Suitable materials for forming fuel compartments and for the walls 114 include glass, ceramics, plastics, polymers, aerogels, and xerogels, among many others.

The walls 114 may bound the fuel compartments 110 on multiple sides, and can be located, for instance, on the terminal ends of a row of fuel compartments, between fuel compartments, or across the top of individual fuel compartments. Preferably, the fuel compartment walls 114 have a porosity of at least 10%, more preferably at least 20%, and most preferably at least 50%.

Preferably, the fuel compartments are thermally isolated from each other such that the thermal initiation of an exothermic hydrogen generation storage composition in a first compartment does not cause an exothermic hydrogen generation storage composition in a neighboring fuel compartment to also initiate. Walls 114 may be a thermal insulator or may conduct some heat as long as their thermal conductivity does not result in the transfer of enough thermal energy to initiate neighboring fuel compartments.

Each fuel compartment preferably contains at least one exothermic hydrogen generation storage composition 102 and at least one endothermic composition 202. These compositions are preferably compacted into a form such as a pill or a pellet, though other solid forms can be used. The exothermic composition 102 and the endothermic composition 202 may be formed in separate pills or pellets, or may be combined into a single pellet. The amount or formulation of the exothermic hydrogen generation storage composition 102 and endothermic composition 202 in each of the fuel compartments need not be the same, and can be varied, for example, to produce different amounts of hydrogen from different fuel compartments. The endothermic composition 202 cannot be initiated independently of the exothermic hydrogen generation storage composition 102, and the initiation element 112 does not directly initiate a reaction in the endothermic material 202. The fuel compartments may be completely filled, or there may be void space within the fuel compartment.

The exothermic hydrogen generation storage composition 102 within each fuel compartment is in contact with an initiation element 112 that can be individually controlled. The relative location of the initiation element 112 within the fuel compartment is not limited and may be located anywhere within the fuel compartment as long as it is in contact with at least a portion of the exothermic hydrogen generation storage composition 102. Initiation elements suitable for use in the invention include, but are not limited to, resistance heaters, nickel-chromium resistance wires, spark ignitors, thermistors, and heat exchangers.

The fuel cartridge can be equipped with an optional hydrogen outlet 116 to supply hydrogen to, for example, a hydrogen-consuming or hydrogen-storing device. The cartridge may further include hydrogen flow regulating mechanisms that condition the hydrogen to a desired temperature and pressure such as heat exchangers, pressure regulators, and gas scrubbers or filters. In some embodiments, a fuel cell may be contained within the fuel cartridge and the optional hydrogen outlet 116 would not be required. Such a cartridge can contain gas conduits within the cartridge to provide hydrogen to the anode of the fuel cell. The fuel cartridges can further contain transducers or other measurement devices, such as thermocouples or pressure gauges, for example, and can monitor system parameters including, but not limited to, temperature and pressure.

Figure 2B:
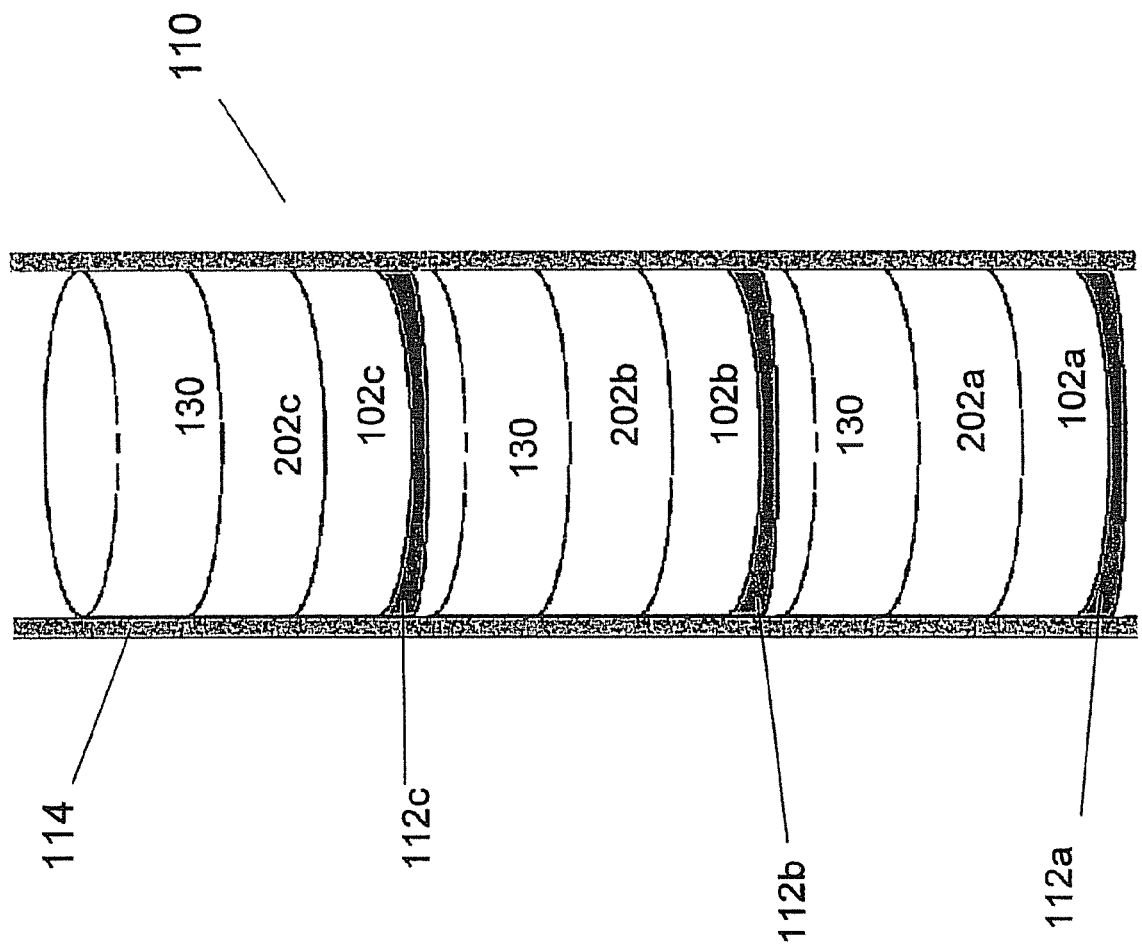

Referring now to FIG. 2A, wherein features that are similar to those shown in previous figures have like numbering, an arrangement of a fuel compartment according to an exemplary embodiment of the invention includes walls 114 bounding a plurality of exothermic hydrogen fuel compositions 102 (102a, 102b, 102c, and 102d), preferably formed into pellets (also referred to as "exo pellets"), separated from each other by endothermic compositions 202 (202a, 202b, 202c, and 202d), preferably formed into pellets (also referred to as "endo pellets"), wherein each of the hydrogen fuel compositions 102 is in contact with a separate initiation element 112 (112a, 112b, 112c, and 112d). Such a design is described herein as "stacks and wells," wherein a plurality of alternating exothermic compositions 102 and endothermic compositions 202, a "stack," are placed within a single fuel compartment, or "well." For illustrative purposes only, the stack configuration in FIG. 2 comprises four pairs of endothermic and exothermic compositions; this embodiment is not limited to the illustrated exemplary arrangement. Stacks and wells can be arranged in a variety of geometric arrangements within a cartridge.

Spacers can be optionally included within a stack to separate pairs of endothermic and exothermic compositions. For example, referring to FIG. 2B, spacers 130 can be included between endothermic composition 202a and initiation element 112b, between endothermic composition 202b and initiation element 112c, and between endothermic composition 202c and initiation element 112d. Preferably, the spacers 130 permit hydrogen gas to pass though and are comprised of glass, ceramics, cellulose, minerals, xerogels or aerogels, for example. The spacers can be configured as textiles, fabrics, tapes, strips, boards, or papers, among others. Examples of useful materials for spacers include, but are not limited to, boron nitride, high alumina ceramics, zirconium phosphate ceramics, alumina bisque, alumina silicate, glass mica, silica, alumina, zirconia, fiberglass, vermiculite-coated fiberglass, mineral-treated fiberglass, silicone-coated fiberglass, carbon fabric, high alumina fabric, silica fabric, calcium silicate, millboard, chromia, tin oxide, and carbon.

Further, each exo pellet may be bounded on both sides by an endo pellet as illustrated in FIG. 2C, wherein features that are similar to those shown in previous figures have like numbering. In such an arrangement, an exothermic composition 102 bounded on both sides by an endothermic composition 202 comprises a "unit cell" of the stack and each unit cell can be further separated from its neighbors by an optional spacer 130. FIG. 2C illustrates two unit cells, a first unit cell represented by the exo pellet 102a bounded by two endo pellets 202a and a second unit cell represented by the exo pellet 102b bounded by two endo pellets 202b. Upon the initiation of a first exo pellet 102, hydrogen and heat are released in an exothermic reaction. The heat released from the exo pellet can be used to initiate hydrogen generation from both of the neighboring endo pellets.

The endo and exo pellets do not need to be the same size; the size of each pellet is instead related to the relative quantity of heat released from the exo pellet and the quantity of heat absorbed by the endo pellet. Referring to FIGS. 3A and 3B, in some exemplary embodiments the endo pellets and exo pellets may be substantially the same size (FIG. 3A), the endo pellet can be larger than the exo pellet (FIG. 3B), or the exo pellet may be larger than the endo pellet (not illustrated). The endo pellet should preferably be sufficiently heat-absorbing such that adjacent exo pellets do not initiate in response to hydrogen generation and heat release from a first exo pellet. It is not necessary however that the endo pellet absorb all of the heat released by adjacent exo pellets. Adjacent exo pellets can be initiated by using an initiation element 112 that contacts an individual pellet.

The fuel compartments can be arranged in multiple layers as illustrated in FIG. 4, wherein an exothermic hydrogen storage composition 102, for example, formed as a pellet, in a first layer is juxtaposed to an endothermic composition 202 in an adjacent layer.

In another exemplary embodiment, the at least one exothermic hydrogen generation storage composition 102 and at least one endothermic composition 202 are contained within separate fuel compartments rather than stacked within a single compartment. Such compartments may be arranged, for example, in a linear sequential arrangement as shown in FIG. 5, or in nested arrangements such a concentric circles as shown in FIG. 6, or a honeycomb configuration as shown in FIG. 7.

Figure 5:
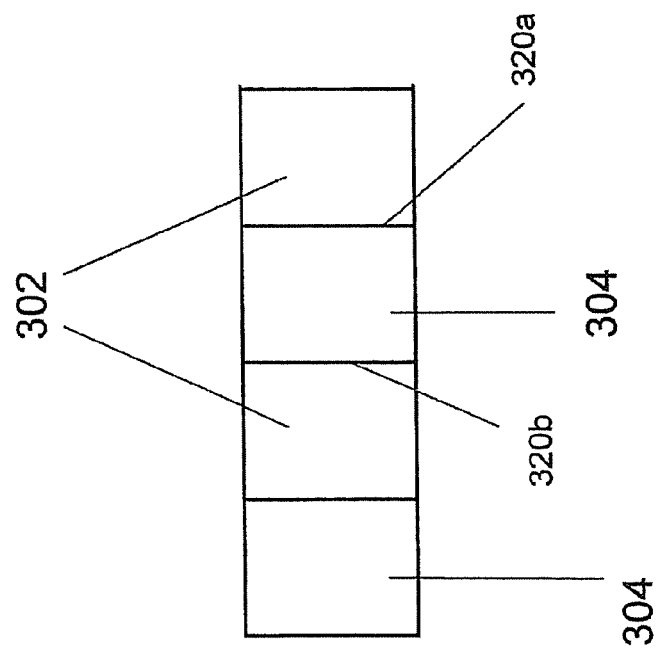
FIG. 5 is a diagram of an arrangement of fuel compartments in accordance with an embodiment of the invention.
Figure 6:
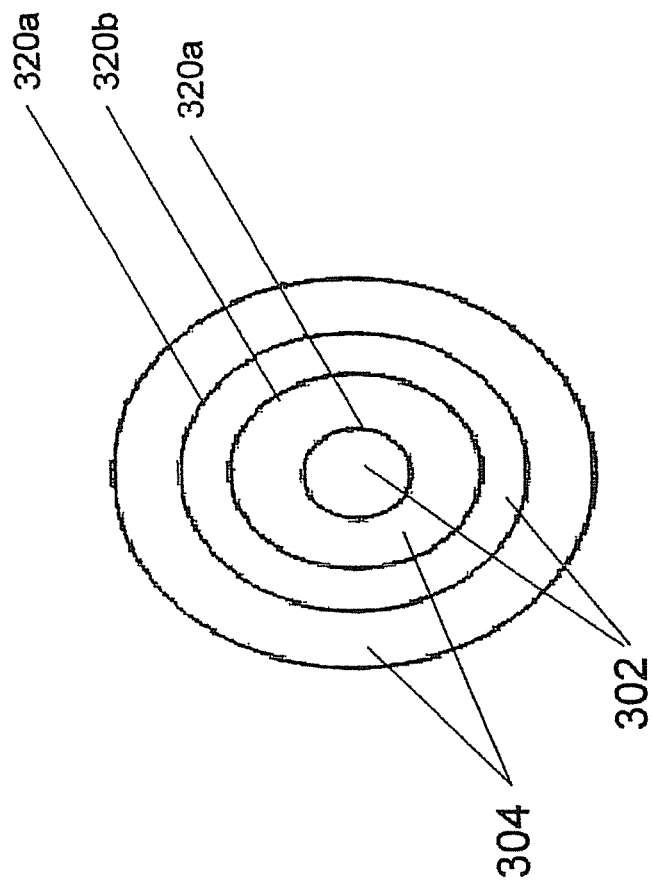
FIG. 6 is a diagram of an arrangement of fuel compartments in accordance with an embodiment of the invention.
Figure 7:
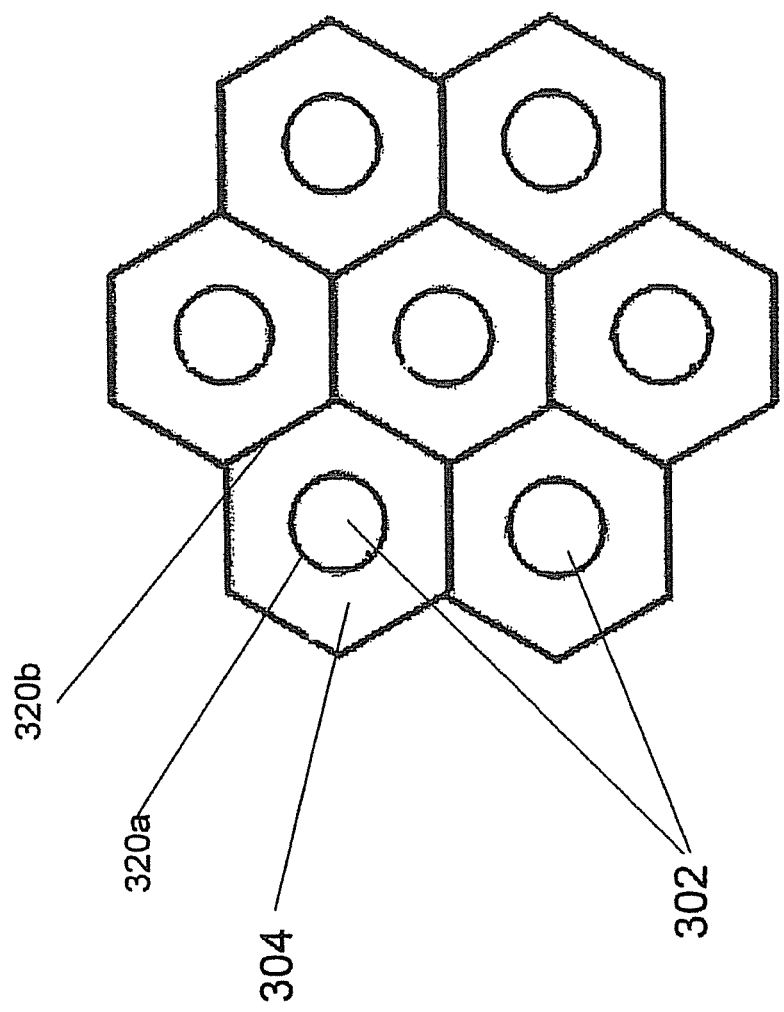
FIG. 7 is a diagram of an arrangement of fuel compartments in accordance with an embodiment of the invention.

Referring to FIGS. 5 to 7, a plurality of fuel compartments 302 configured to retain at least one exothermic hydrogen storage composition 102 are bounded by walls 320 and comprise at least one initiation element 112 (not illustrated in these figures). Preferably, at least a portion of the walls 320 have a porosity of at least 10%, and more preferably at least 20%, and most preferably at least 50%, and the walls 320 are configured to allow the hydrogen generated within each fuel compartment to pass from the fuel compartment while retaining the solid and liquid materials with the fuel compartment 302. Preferably, each of the fuel compartments 302 is adjacent to a compartment 304 configured to retain an endothermic composition 202. Either a fuel compartment 302 or an endothermic chamber 304 may comprise the outermost cell of an array of fuel compartments. In certain preferred embodiments, an endothermic compartment 304 comprises the outermost layer.

To assist in the transfer of heat from the exothermic hydrogen storage composition 102 in a fuel compartment 302 to an endothermic composition 202 in a compartment 304, wall 320a may comprise a material with high thermal conductivity such as, for example, metal or ceramic foams. The wall may further comprise heat fins extending into the compartment 304 containing the endothermic composition 202.

Hydrogen is generated from the exothermic hydrogen generation storage composition when heat is applied, preferably by initiating at least one compartment at a time. Multiple compartments can be initiated at the same time to achieve variable hydrogen generation rates or generated gas volumes. The initiation can be achieved, for example, by heating the compartment as a whole, or by an initiation element in contact with the exothermic hydrogen generation storage composition. The exothermic composition 102 within each fuel compartment is in contact with an initiation element 112, such as, for example, a resistance heater, a spark igniter, a nickel-chromium resistance wire, or a heat exchanger, that can be individually controlled. The relative location of the initiation element 112 within the fuel compartment is not limited and may be located anywhere within the fuel compartment as long as it is in contact with at least a portion of the exothermic hydrogen generation storage composition 102.

Referring back to FIG. 2, a method for hydrogen generation using a stack and well configuration, comprises operating a first initiation element 112a to initiate a reaction of a first exothermic hydrogen storage composition 102a to produce both heat and hydrogen. This heat is absorbed by the endothermic composition 202a resulting in a reaction, such as the generation of additional hydrogen. A second initiation element 112b can then initiate a second exothermic hydrogen storage composition 102b to produce heat and hydrogen, and then that heat is absorbed by a second endothermic composition 202b. This process can be repeated with a third exothermic hydrogen storage composition 102c and a fourth exothermic hydrogen storage 102d composition, and so on, until all exothermic hydrogen storage compositions 102 within a given fuel compartment have been reacted. Multiple stacks within a fuel compartment 110, and/or multiple fuel compartments, may be operated concurrently or individually.

Alternatively, a stack can be initiated in an "inside out" process in a method which includes operating a first initiation element 112b to initiate a reaction of a first exothermic hydrogen storage composition 102b to produce both heat and hydrogen. That heat is absorbed by the endothermic composition 202b resulting in a reaction, such as the generation of additional hydrogen. A second initiation element 112c can then initiate a reaction of a second exothermic hydrogen storage composition 102c to produce heat and hydrogen, and then that heat is absorbed by a second endothermic composition 202c. This process can be repeated with a third exothermic hydrogen storage composition 102a and a fourth exothermic hydrogen storage 102d composition and so on, until all exothermic hydrogen storage compositions 102 within a given fuel compartment have been reacted.

A "fuel gauge" feature can be incorporated into fuel cartridges according to the disclosed and other embodiments of the present invention to indicate the number of compartments—and thus how much energy—remains in the device by including a controller to monitor the number of compartments which have been heated and used. Each compartment is typically initiated one time, after which it will not produce any more hydrogen. Within the control architecture, the controller will monitor which compartments have been used and which have not, as well as the total number of compartments, so that it can initiate the next reaction in the proper place. An exemplary fuel gauge can report a completion percentage indicating the remaining fuel by computing the number of compartments that have been used divided by the total number of compartments. For example, if the device contains 100 compartments, and 53 have been used, then the cartridge is 53% spent (or has 47% of its energy remaining).

In reference to the illustrated embodiments, the initiation element 112 has been shown as a plate that resides in the stack with the pellets (for example, as shown in FIG. 8A). Other arrangements of initiation elements and exo pellets useful in these and other embodiments of the invention are presented in FIGS. 8B and 8C. In some embodiments, the initiation element 112 need only contact a portion of the pellet in order to initiate a complete reaction. An initiation element 112, such as a resistance heater, touching the surface of an exo pellet (such as one containing LiAlH$_4$ and Al(OH)$_3$ in a 2:1 molar ratio) as shown in FIG. 8B, initiates the reaction of the entire pellet. The initiation element 112 can alternatively be a wire that is in contact with a face of a pellet, as shown in FIG. 8C. Such a wire can be between the endo pellets and the exo pellets.

In an exemplary embodiment of a hydrogen generation composition, the exothermic hydrogen generation storage composition comprises a mixture of lithium aluminum hydride (LiAlH$_4$) and aluminum hydroxide (Al(OH)$_3$) combined in a molar ratio of about 2 to about 4 moles of LiAlH$_4$ per mole of Al(OH)$_3$, and the endothermic composition comprises a mixture of lithium hydride (LiH) and lithium amide (LiNH$_2$) in a molar ratio of about 1 to about 2 moles of LiH per mole of LiNH$_2$ (Equation 2). The LiAlH$_4$/Al(OH)$_3$ reaction produces 705 kJ utilizing 4 moles of LiAlH$_4$ and 2 moles of Al(OH)$_3$, which is sufficient energy to raise the reactant temperature of the endothermic reaction materials (such as the reactant shown in Equation 2) and drive the dehydrogenation of 4 moles of the lithium amide and 8 moles of lithium hydride which requires 161 kJ per mole of lithium amide as shown in Equation 2. The net yield of the coupled reactions is 8.05 wt-% H$_2$ from the reagents and about 3 kJ of heat released per mole of H$_2$ released.

In another exemplary embodiment of a hydrogen generation composition, the exothermic hydrogen generation storage composition comprises a mixture of LiH with fructose, and the endothermic composition comprises the perhydroform of coronene. LiH and fructose will react to produce hydrogen and heat when thermally intitated, as provided in Equation 3. The heat can be used to drive the dehydrogenation of perhydrocoronene to coronene (Equation 4).

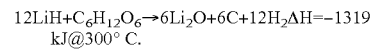

$$12\text{LiH} + \text{C}_6\text{H}_{12}\text{O}_6 \rightarrow 6\text{Li}_2\text{O} + 6\text{C} + 12\text{H}_2 \Delta\text{H} = -1319 \text{ kJ@}300°\text{ C}. \qquad \text{Eqn. 3}$$

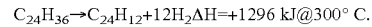

$$\text{C}_{24}\text{H}_{36} \rightarrow \text{C}_{24}\text{H}_{12} + 12\text{H}_2 \Delta\text{H} = +1296 \text{ kJ@}300°\text{ C}. \qquad \text{Eqn. 4}$$

The stoichiometry illustrated in Equation 3 produces 1319 kJ per mole of fructose, which is sufficient energy to raise the reactant temperature of the endothermic reaction materials (e.g., such as the reactant shown in Equation 4) and drive the dehydrogenation of one mole of the perhydro-form of coronene to coronene which requires 1296 kJ per mole of coronene as shown in Equation 4. The net yield of the coupled reactions is 8.06 wt-% H$_2$ from the reagents and less than 1 kJ of heat released per mole of H$_2$ released.

In another exemplary embodiment of a hydrogen generation composition, the exothermic hydrogen generation storage composition comprises a mixture of ammonia borane ($BH_3NH_3$), lithium aluminum hydride ($LiAlH_4$), and aluminum hydroxide ($Al(OH)_3$) combined in a molar ratio of 4:4:2, respectively, and the endothermic composition comprises magnesium carbonate ($MgCO_3$) as described in Equation 1. The thermal initiation of the exothermic mixture will produce both hydrogen and heat which in turn will drive the thermal decomposition of the endothermic component $MgCO_3$ to produce carbon dioxide (Equation 1). The $BH_3NH_3$/$LiAlH_4$/$Al(OH)_3$ reaction produces 1202 kJ utilizing 4 moles each of $BH_3NH_3$ and $LiAlH_4$, and 2 moles of $Al(OH)_3$, which is sufficient energy to raise the reactant temperature of the endothermic reaction materials (such as the reactant shown in Equation 1) and drive the decomposition of 12 moles of the $MgCO_3$ which requires 99 kJ per mole of magnesium carbonate as shown in Equation 1. The net yield of the coupled reactions is 3.15 wt-% $H_2$ from the reagents and less than 1 kJ of heat released per mole of $H_2$ released.

While the present invention has been described with respect to particular disclosed embodiments, it should be understood that numerous other embodiments are within the scope of the present invention. Accordingly, it is not intended that the present invention be limited to the illustrated embodiments, but only by the appended claims.

What is claimed as new and desired to be protected by Letters Patent of the United States is:

1. A fuel cartridge comprising:
a housing;
a plurality of fuel compartments having porous walls disposed within said housing;
at least one exothermic hydrogen generation composition disposed within at least one fuel compartment, wherein said exothermic hydrogen generation composition comprises at least one chemical hydride and at least one water surrogate source; and
at least one endothermic gas generation composition disposed within at least one fuel compartment; and
at least one initiation element in thermal communication with the at least one exothermic hydrogen generation composition;
wherein heat released from the initiation element is sufficient to initiate an exothermic reaction within the exothermic hydrogen generation composition without the use of additional material; and
wherein heat released from the exothermic reaction initiates the endothermic gas generation composition to undergo an endothermic reaction.

2. The fuel cartridge in accordance with claim 1, wherein each fuel compartment contains only one of the endothermic gas generation composition and the exothermic hydrogen generation composition.

3. The fuel cartridge in accordance with claim 1, wherein each fuel compartment contains both of the endothermic gas generation composition and exothermic hydrogen generation composition.

4. The fuel cartridge in accordance with claim 3, wherein the exothermic hydrogen generation composition is in the form of a first pellet, the endothermic gas generation composition is in the form of a second pellet, and the first pellet and the second pellet in contact provide a gas generation pair.

5. The fuel cartridge in accordance with claim 4, wherein the initiation element is disposed between the first pellet and the second pellet.

6. The fuel cartridge in accordance with claim 4, wherein the initiation element touches the side of the first pellet.

7. The fuel cartridge in accordance with claim 4, comprising a plurality of gas generation pairs.

8. The fuel cartridge in accordance with claim 7, wherein each of the plurality of gas generation pairs is separated from one another by a spacer configured to permit hydrogen gas to pass therethrough.

9. The fuel cartridge of claim 8, wherein the spacer is comprised of a material selected from the group consisting of glass, ceramics, cellulose, minerals, xerogels and aerogels.

10. The fuel cartridge in accordance with claim 4, wherein the gas generation pair further includes a third pellet of an endothermic gas generation composition in contact with the first pellet of the exothermic hydrogen generation composition.

11. The fuel cartridge in accordance with claim 4, wherein the fuel compartments are arranged in a plurality of layers arranged such that the first pellet comprising the exothermic hydrogen generation composition in a first layer is juxtaposed to the second pellet of the endothermic gas generation composition in a second layer.

12. The fuel cartridge in accordance with claim 1, wherein the at least one chemical hydride is selected from the group consisting of boron hydrides, ionic hydride salts, and aluminum hydrides.

13. The fuel cartridge in accordance with claim 12, wherein the chemical hydride is a boron hydride selected from the group consisting of borohydride salts [$M(BH_4)_n$], triborohydride salts [$M(B_3H_8)_n$], decahydrodecaborate salts [$M_2(B_{10}H_{10})_n$], tridecahydrodecaborate salts [$M(B_{10}H_{13})_n$], dodecahydrododecaborate salts [$M_2(B_{12}H_{12})_n$], and octadecahydroicosaborate salts [$M_2(B_{20}H_{18})_n$], where M is an alkali metal cation, alkaline earth metal cation, aluminum cation, zinc cation, or ammonium cation, and n is equal to the charge of the cation.

14. The fuel cartridge in accordance with claim 12, wherein the chemical hydride is a boron hydride selected from the group consisting of decaborane(14) ($B_{10}H_{14}$) and tetraborane (10) ($B_4H_{10}$).

15. The fuel cartridge in accordance with claim 12, wherein the chemical hydride is an ammonia borane selected from the group consisting of compounds of formula $NH_xBH_y$ and $NH$, $RBH_y$, wherein x and y are independently an integer from 1 to 4 and do not have to be the same, and R is a methyl or ethyl group; $NH_3B_3H_7$, and $NH(CH_3)_2BH_3$.

16. The fuel cartridge in accordance with claim 12, wherein the chemical hydride is an ionic hydride selected from the group consisting of hydrides of alkali metals, alkaline earth metals, and zinc metal, having the general formula $MH_n$ wherein M is a cation selected from the group consisting of alkali metal cations, alkaline earth metal cations, and zinc(II), and n is equal to the charge of the cation.

17. The fuel cartridge in accordance with claim 12, wherein the chemical hydride is an aluminum hydride selected from the group consisting of alane and aluminum hydride salts.

18. The fuel cartridge in accordance with claim 17, wherein the aluminum hydride salts have the formula $M(AlH_4)_n$, where M is an alkali metal cation, alkaline earth metal cation, aluminum cation, zinc cation, or ammonium cation, and n is equal to the charge of the cation.

19. The fuel cartridge in accordance with claim 1, wherein the at least one water surrogate source is selected from the group consisting of the hydroxide salts of alkali and alkaline earth metals, and the hydroxide compounds of Group 13 elements.

20. The fuel cartridge in accordance with claim 1, wherein the at least one chemical hydride is lithium aluminum hydride and the at least one water surrogate source is aluminum hydroxide.

21. The fuel cartridge in accordance with claim 20, wherein the aluminum hydroxide is present in molar excess relative to the lithium aluminum hydride.

22. The fuel cartridge in accordance with claim 20, wherein the lithium aluminum hydride is present in molar excess relative to the aluminum hydroxide.

23. The fuel cartridge in accordance with claim 1, wherein the at least one chemical hydride is BH$_3$NH$_3$ and at least one water surrogate source is aluminum hydroxide.

24. The fuel cartridge in accordance with claim 1, wherein the at least one chemical hydride is BH$_3$NH$_3$, and lithium aluminum hydride, and the at least one water surrogate source is aluminum hydroxide.

25. The fuel cartridge in accordance with claim 1, wherein the at least one water surrogate source is selected from the group consisting of alkali metal dihydrogen phosphate salts; alkali metal dihydrogen citrate salts; sulfate salts of alkali and alkaline earth metals, phosphate salts of alkali and alkaline earth metals; and compounds of formula $M_y[O_pX(OH)_q]_n$ where M is an alkali metal or NH$_4$, q is an integer from 0 to 3, p is an integer from 0 to 3, y is the valence of the anion $[O_pX(OH)_q]$, and n is the valence of M, and X is S, P, or Se.

26. The fuel cartridge in accordance with claim 1, wherein the at least one water surrogate source is selected from the group consisting of alcohols; polymeric alcohols; silicates; silica sulfuric acid; acid chloride compounds; hydrogen sulfide; and amines.

27. The fuel cartridge in accordance with claim 1, wherein the at least one water surrogate source is selected from the group consisting of carbohydrates; borate salts; carboxylic acids; bicarbonate salts; and allylic alcohols.

28. The fuel cartridge in accordance with claim 1, wherein the at least one chemical hydride is sodium borohydride and the at least one water surrogate source is sorbitol.

29. The fuel cartridge in accordance with claim 1, wherein the at least one chemical hydride is lithium borohydride and the at least one water surrogate source is mannitol.

30. The fuel cartridge in accordance with claim 1, wherein the at least one chemical hydride is lithium hydride and the at least one water surrogate source is fructose.

31. The fuel cartridge in accordance with claim 1, wherein the porous walls are comprised of a material selected from the group consisting of glasses, ceramics, plastics, polymers, aerogels, and xerogels.

32. The fuel cartridge in accordance with claim 1, wherein the porous walls have a porosity of at least 10%.

33. The fuel cartridge in accordance with claim 1, wherein the initiation element is selected from the group consisting of resistance heaters, spark igniters, nickel-chromium resistance wires, and heat exchangers.

34. The fuel cartridge in accordance with claim 1, wherein the initiation element is a wire.

35. The fuel cartridge in accordance with claim 1, wherein the initiation element is a plate.

* * * * *